BIDIRECTIONAL CURRENT DRIVE CIRCUIT

Filed Nov. 28, 1958

2 Sheets-Sheet 1

INVENTORS
GEORGE H. BARNES
ROBERT P. SCHNEIDER

BY William E. Cleaver
AGENT

BIDIRECTIONAL CURRENT DRIVE CIRCUIT

Filed Nov. 28, 1958 2 Sheets-Sheet 2

INVENTORS
GEORGE H. BARNES
ROBERT P. SCHNEIDER
BY William E. Cleaver
AGENT

United States Patent Office 2,993,198

Patented July 18, 1961

2,993,198

BIDIRECTIONAL CURRENT DRIVE CIRCUIT

George H. Barnes, Berwyn, and Robert P. Schneider, King of Prussia, Pa., assignors to Burroughs Corporation, Detroit, Mich., a corporation of Michigan Filed Nov. 28, 1958, Ser. No. 777,137

10 Claims. (Cl. 340—174)

This invention relates to data storage systems and in particular to an improved read-write drive circuit for a magnetic core matrix memory.

Magnetic core memories have been extensively employed in data processing systems. The cores are ordinarily made of ferromagnetic material having a substantially rectangular hysteresis loop characteristic and each of the cores is capable of being driven selectively to one or the other of two remanent states of magnetism of opposite polarities, one of which may represent the "zero" state and the other the "one" state. The cores are arranged electrically (and also ordinarily physically) in a coordinate matrix of rows and columns forming a core plane matrix. Various address and switching schemes have been developed for writing binary information into and for extracting information from such a plane magnetic-core matrix memory. A description of one form of such a magnetic core matrix memory, and references to others, may be found in an article, entitled "Myriabit Magnetic Core Matrix Memory," by J. A. Rajchman, published in the October 1953 issue of the Proceedings of the I.R.E.

In the core matrix memory described in the above article, read-out is accomplished by a coincident current technique, effective to read out at any given time only a single core of the plane matrix. Read-out of the single core is accomplished by energizing simultaneously, with half-select current pulses, a winding which threads a row of cores which includes the selected core and a winding which threads a column of cores which includes the same selected core. The selected core, being located at the intersection of the energized row and column, receives full select current and, unless already in the "zero" state, is fully switched. The prior-art random access magnetic core matrix memories operating on the coincident current principle are not necessarily single plane memories. They may comprise a plurality of plane core matrices, but in each plane the selected core is read out by passing a half-select read current along the row and a half-select read current along the column in each of which the selected core is located.

While the coincident-current scheme briefly described above has been found to be generally satisfactory, it has at least one objectionable feature, namely, that the non-selected cores of both the energized row and the energized column receive half-select currents and may be partially switched. Such partial switching gives rise to noise and spurious signals, and this presents a severe limitation in the design of coincident current magnetic core memories. This limitation is most serious if the memory is required to operate either at relatively high speeds (less than 5 microseconds for a read-write cycle) or to be subjected to large variations in ambient temperatures.

In order to operate at relatively high speed read-write cycles or under relatively large ambient temperature variations, the prior art has employed a line selection or word organized technique. In general, full value currents are employed for read-out and an unbalanced coincident current technique for writing. According to this technique, a multi-plane arrangement is necessarily employed with each plane comprising a matrix of cores arranged in rows and columns. In this scheme, each core occupying a similar position in each plane matrix is threaded by a common wire or winding. Each core in each plane matrix represents a digit or bit while the plurality of common-threaded cores, one in each of the plurality of plane matrices, when considered together, represent a binary coded word. The word is read out by energizing the multi-plane common winding which threads all of the digt cores of which the word is comprised. The word to be read out can be selected by known forms of random access address selection circuits such as a diode switching matrix. In the prior art arrangements, interposed between the address selection circuits and the multi-plane matrix memory is either a plurality of non-square hysteresis-loop transformers, one for each word, or a plurality of square-loop switching cores, one for each word. Each transformer, or each switching core, includes a primary winding coupled to the address selection circuits and through which read-out current is driven. Each transformer also includes a secondary winding; this winding is coupled to the single wire which threads in common each digit core comprising the binary word and through which the induced read-out current flows.

In the arrangement where the coupling between the address selection circuits and the memory is effected by means of a non-square transformer, the digit cores comprising the binary word have, according to the prior art, been read out by causing the address selection circuit to drive current through the primary of the selected transformer, thereby causing a voltage pulse to be induced in the secondary winding. This induced voltage is of a polarity to drive read current through the common winding which threads the selected digit cores in a predetermined direction and is sufficient in magnitude to switch the cores to the "zero" state. Writing is achieved in response to the flyback or collapse of the magnetic field of the non-square characteristic transformer. The secondary voltage induced during the write operation is of a polarity and magnitude which will drive current through the selected common winding in a direction opposite to that of the initial read drive current. Such opposite-direction current is used as a partial write current, as for example a two-thirds write current. In order to write a "one" in some of the cores and a "zero" in other of the cores comprising the binary coded word, the flyback partial current is combined with information writing current separately controlled by the data control circuits for each core plane in a parallel form of writing operation. Such information writing current is also a partial value. In this case the information writing current has a one-third value, and either aids or opposes the current induced in the multi-plane common winding by the flyback of the transformer. Thus, each selected digit core is subjected to a total write current of either full value (two-thirds plus one-third) or one-third value (two-thirds minus one-third), and each non-selected core is subjected to a partial write current of plus or minus one-third value. This last described prior art arrangement also has its limitations in that the partial write current pulse generated by the flyback of the transformer may be of unsatisfactory waveform and in that critical damping is needed to prevent oscillatory momentum from spawning a subsequent pulse of current in the read direction.

In the prior art word organized memory in which a square-loop switching core is employed between the address selection circuits and the multi-plane matrix memory, the switching core, in addition to having primary and secondary windings, is provided with a reset winding through which a D.-C. bias current flows of sufficient magnitude to fully switch the switching core. The current from the address selection circuit driven through the primary winding of the switching core must, of course, be of sufficient magnitude to override the D.-C. bias. Such type of prior-art word-organized matrix memory also has some objectionable features or difficulties, one of which is that the net flux change in the switching core during a read-write cycle tends to be different according to the information read-out from the memory. As a result, the net flux change during a read-write cycle may be other than zero, in which case a "creeping" of flux density of the switching core will occupy. This is obviously most undesirable.

To better understand the difficulty just referred to, consider the binary coded word representing the decimal number 15 which, writtten in binary number form, is 1–1–1–1. Thus, each digit core will be in the "one" state. In reading out a group of cores each of which is in the "one" state, each digit core is switched to the "zero" state and, accordingly, each digit core presents a high impedance to current flow through the multi-plane common read winding. The amount of current flowing in the multi-plane common winding, and hence in the secondary winding of the switchig core, on read-out is, therefore, less than it would have been had each digit core read out been in the "zero" state. Thus, in reading the binary coded word 1–1–1–1, the flux change in the square-loop switching core, in response to the selection-circuit current driven through its primary winding, is relatively large. In contrast thereto, where the binary word read out corresponds to the decimal 0, which in binary number form is 0–0–0–0, each digit core read out presents a low impedance to the read current. Thus, a relatively large current flows in the multi-plane common winding and in the secondary of the switching core. A large back E.M.F. is generated, and the flux change in the switching core, in response to the primary drive current, is relatively small. It follows, then, that when the selected switching core is reset by the D.-C. bias current, as it is after each read-out, the flux change in the said switching core will be different according to the information just previously read out. Since the voltage induced in the secondary of the switching core by the D.-C. bias is employed to drive a partial write current through the multi-plane common winding in a direction opposite to that of the read current, such partial write current will vary in magnitude in accordance with the flux change in the switching core. As just described, this flux change varies as a function of the information read out. The difficulty just described has been recognized by the prior art and an attempt has been made to overcome the same by placing a "swamping" resistor in series with the common winding which threads the digit cores of the word. While the employment of such a swamping resistor tends to make the current flow under the various conditions more nearly the same, the swamping resistor consumes energy and represents a waste of power.

In view of the difficulties encountered by the prior art in providing a satisfactory read-write system for a magnetic-core matrix memory, an important object of the present invention is to provide an improved read-write system for such memory which overcomes the difficulties mentioned.

A further object of the present invention is to provide a bidirectional current driving read-write circuit capable of providing faster read-write cycles for a magnetic-core matrix memory.

Another object is to provide a read-write drive circuit for use with a magnetic core matrix memory and characterized by an improved signal-to-noise ratio.

Another object is to provide a high speed read-write circuit for a magnetic core memory which is relatively less sensitive to drive current variations as well as to variations in temperature.

Other objects will be apparent from the description which follows.

In accordance with the present invention, the transformers or switching cores heretofore interposed between the address selection circuits and the magnetic core matrix memory are eliminated and there is provided an arrangement comprising, in addition to the known multi-plane common winding for each binary word, merely a pair of unidirectional current conducting devices, the required current generators or drivers, preferably transistors, and the necessary switching circuits. The arrangement is such that current through the multi-plane common winding may be driven directly, that is without transformer coupling, in one direction to effect read-out and in the other direction to effect write-in.

Another important feature is that the circuit parameters are preferably so selected that the read current through the multi-plane common winding is of full select value, but the write current through the multi-plane common winding is of partial select value, preferably having a value of two-thirds the magnitude necessary to fully switch a digit core. This write current through the multi-plane common winding is combined, in each core plane, with an information write current driven through a winding threading in common all the digit cores of a single plane, the information write current in each plane having a value of either plus or minus one-third the value of the multi-plane common winding write current. Thus, those digit cores of the binary word in which a "one" is to be written will receive full switching current (two-thirds plus one-third) while those cores in which a "zero" is to be written will receive a net of one-third switching current (two-thirds minus one-third). Each remaining core of each plane will receive a write current of either plus or minus one-third value. Thus, each non-selected core is subjected to a net one-third value of magnetizing force. Since this represents noise, the signal-to-noise ratio is 3:1. This is seen to be appreciably better than the 2:1 signal-to-noise ratio which normally characterizes random access memories operating on the coincident current principle.

The foregoing and other objects and features of this invention will be best understood by reference to the following description of preferred embodiments of the invention taken in conjunction with the accompanying drawings, wherein.

Figure 1:
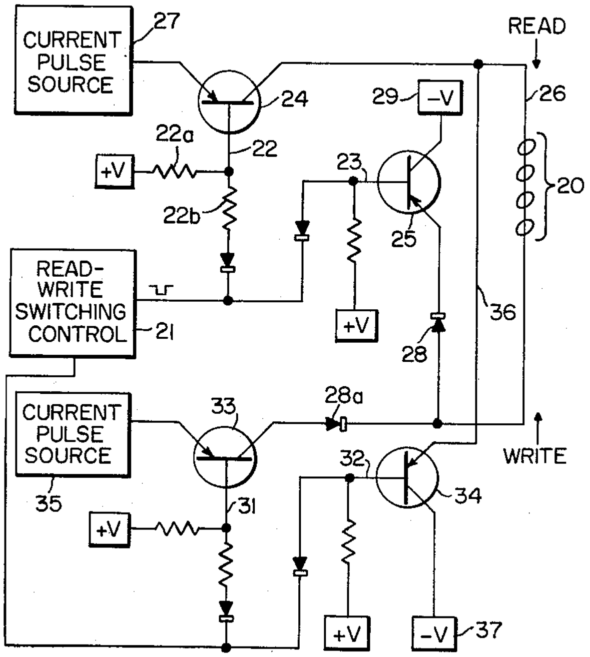
FIG. 1 is a schematic diagram of the basic single drive circuit of the present invention used to read out of and to write into a plurality of cores representing one binary coded word.

Referring to FIG. 1 assume that each of the four cores 20 is a digit core located on a different plane in a magnetic core matrix memory. Assume, further, that each of the cores 20 has been driven to one or the other state of magnetic remanence and, accordingly, represents either a "zero" or a "one." Together, the four cores represent a binary coded word. Assume that by means not shown in FIG. 1, a signal is passed from an address selector circuit to the read-write switching control device 21, calling for a read-out of the binary coded word which has been stored in the cores 20. The read-write switching control device thereupon transmits a negative pulse to the base elements 22 and 23 to condition the transistors 24 and 25 for subsequent conduction when a signal is applied to the emitter element. Because of the voltage divider effect of the two resistors **22*a* and 22*b*, the base element 22 is at a higher potential than the base element 23, which provides that the transistor 24 will not be driven to saturation. In the preferred embodiment it is not desirable to have the transistor 24 driven to saturation since the current through the cores is to be held constant and unaffected by transients, which latter condition would occur if the transistor 24** were to be driven to saturation.

With the transistors 24 and 25 conditioned to conduct there is then passed a current pulse from the source 27 to cause read-drive current to flow along the reading wire 26 through the cores 20 in the read direction.

The current path may be followed from the current pulse source 27 through the transistor 24, downward through the single threading wire 26, through the diode 28, through the transistor 25, to the negative potential source 29. The read-drive current passing, as described above, through the wire 26 threading the cores 20, will develop a magnetizing force of a polarity to cause the cores to be driven to a state of magnetization which may be arbitrarily designated as "zero." Had there been any cores residing at magnetic remanence of opposite polarity representing "one," such cores would have switched and the switching of these "one" cores to the "zero" state would have induced a current along a sensing lead (such as the lead 30 of FIG. 2, or the lead 39 of FIG. 5), and hence, a "one" bit would have been sensed.

Assume that the data processing system, having driven the cores through a read cycle, subsequently (and in high speed operations in a period of time in the neighborhood of 1 microsecond later) indicates to the read-write switching control device 21 that a write cycle is desired. In response to this request, the read-write switching control 21 will transmit a negative pulse to the base elements 31 and 32. The voltage divider circuit coupled to the base element 31 operates in a fashion similar to that described above, in connection with base element 22. As was suggested in connection with the transistor 24, the transistor 33 in the preferred embodiment is not driven to saturation. With the negative potential at the base elements 31 and 32 the respective transistors 33 and 34 will be conditioned for subsequent conduction. A current pulse is applied from the source 35 and the transistor action at the transistors 33 and 34 will provide a write-drive current path from the positive potential source 35, through the transistor 33, upward along the wire 26, through the cores 20, downward along the lead 36, through the transistor 34, to the negative potential source 37. The write-drive current supplied along the path just described is controlled to be of such value that it supplies two-thirds of the current necessary to switch a core in the "zero" state to the "one" state of magnetization. Although not shown in the basic simplified circuit of FIG. 1, there is also provided to each core plane during write time, a pulse of "information" write current which is of a polarity to either aid or oppose the magnetizing force established by the current provided by the write-drive current. The provision of such "information" write current will be described more completely hereinafter. For each of the selected cores in which there is to be stored a binary "one" the information pulse is of a polarity to supply aiding current along the information lead (shown in FIG. 2) and of a value which is one-third of the total amount necessary to fully "select" the core, i.e., to drive the core completely from one state of magnetization to the other. It is seen that any core being subjected to write-drive current, on the read-write lead of two-thirds select value, and to information write current, on the information lead, of one-third select value in an aiding sense, will be switched to the "one" state of magnetization. Each of the selected cores which is not designated to store a binary "one" will also have passed along the information lead of their respective plane of cores, during the "write" time, an information current of one-third select value. However, this information current will be of a polarity to oppose the magnetizing force of the write-drive current and hence the two-thirds value of current necessary to switch the core supplied by the write-drive current is reduced to a net current of one-third value. The net current of one-third value causes a small change in the flux of the core, and consequently, noise.

Figure 4:
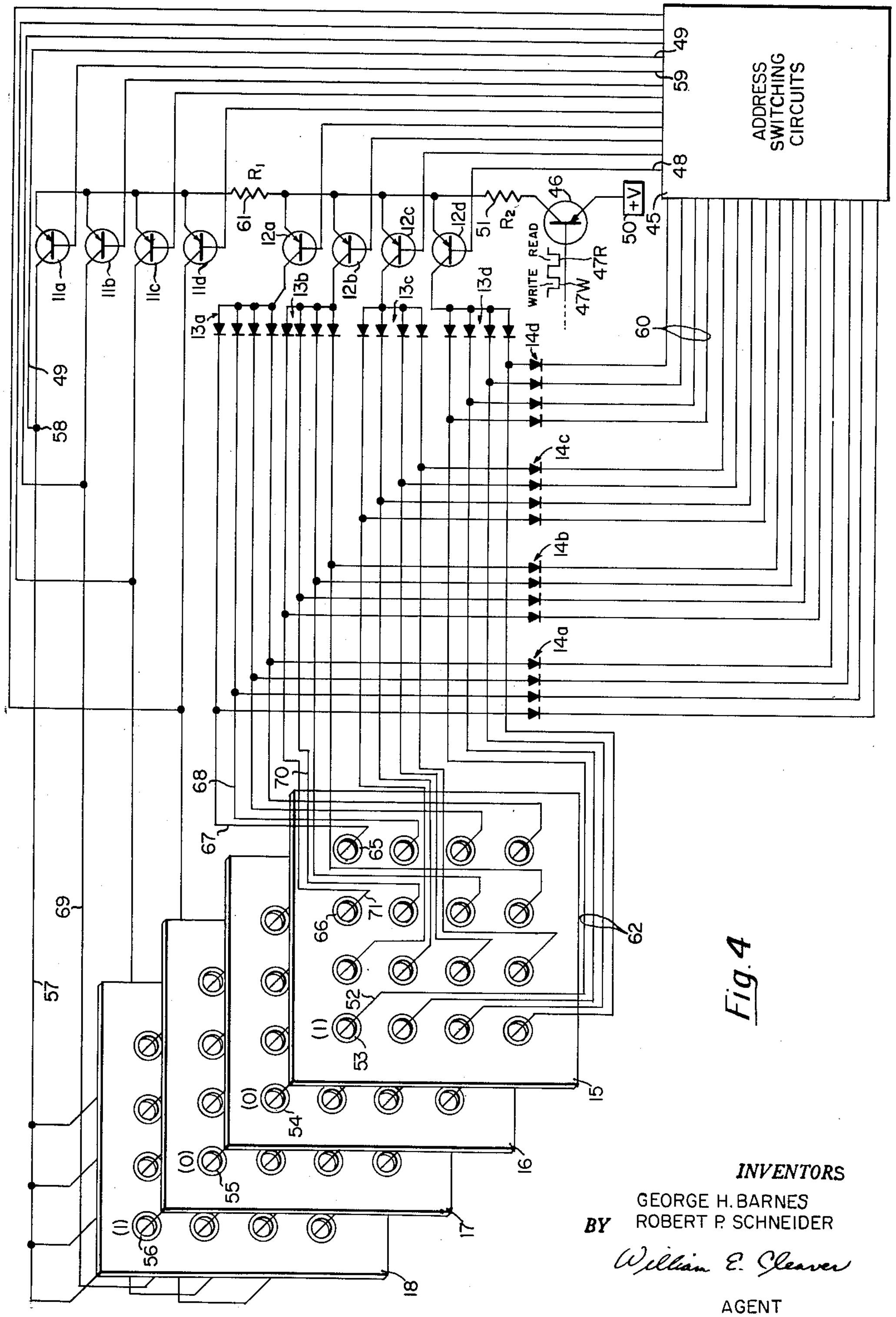
FIG. 4 is illustrative of a matrix memory comprising four digit planes of sixteen cores each capable of storing sixteen words.

It will be seen that by supplying an information write current of one-third switching value, which either aids or opposes the magnetizing effect of the write-drive current according to whether a "one" or a "zero" is to be written, a 3 to 1 ratio for signal-to-noise, in the individual cores, is provided by this particular system. Because of this 3 to 1 ratio the cores can be driven with larger current during the write time than is normally provided in the coincident current technique where there is an inherent 2 to 1 ratio provided. It follows that if in the present invention the cores can be driven with larger current, the switching time of the core is reduced and faster operation is possible. Moreover, there is no noise consideration insofar as the read-drive current pulse is concerned because there is no partial driving of any of the cores in the read operation as is experienced in the coincident current scheme. The read-write cycle in actual practice with the present inventive arrangement has been reduced to 1.8 microseconds as compared to the 5 to 6 microseconds when using the coincident current technique. In FIG. 1 the diodes 28 and 28*a* do have a limited current steering effect, but play their most important role when the basic building block circuit of FIG. 1 is coupled with other such building block circuits to form a memory such as shown in FIG. 4. The diodes 28 and 28*a*, in their most important role, prevent back circuits, which, as will be described hereinafter, would cause certain sets of cores to be switched which were not addressed for switching.

Figure 2:
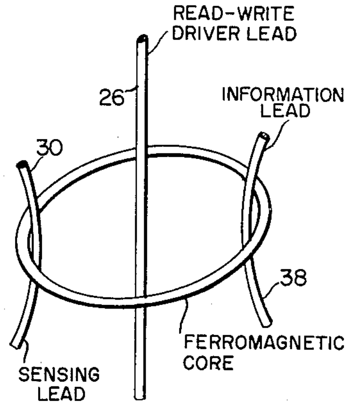
FIG. 2 is an enlarged showing of a core with three control wires disposed for operation therewith.

In FIG. 2 there is shown an enlarged view of one of the ferromagnetic cores 20 with the information lead 38 and the sensing lead 30 passing therethrough as well as the read-write driver lead 26. The sensing lead 30 and the information lead 38 of FIG. 2 are not shown in FIGS. 1 through 4, although they are to be understood as required to be present in the matrix for the operation of the magnetic core memory.

Figures 3, 5:
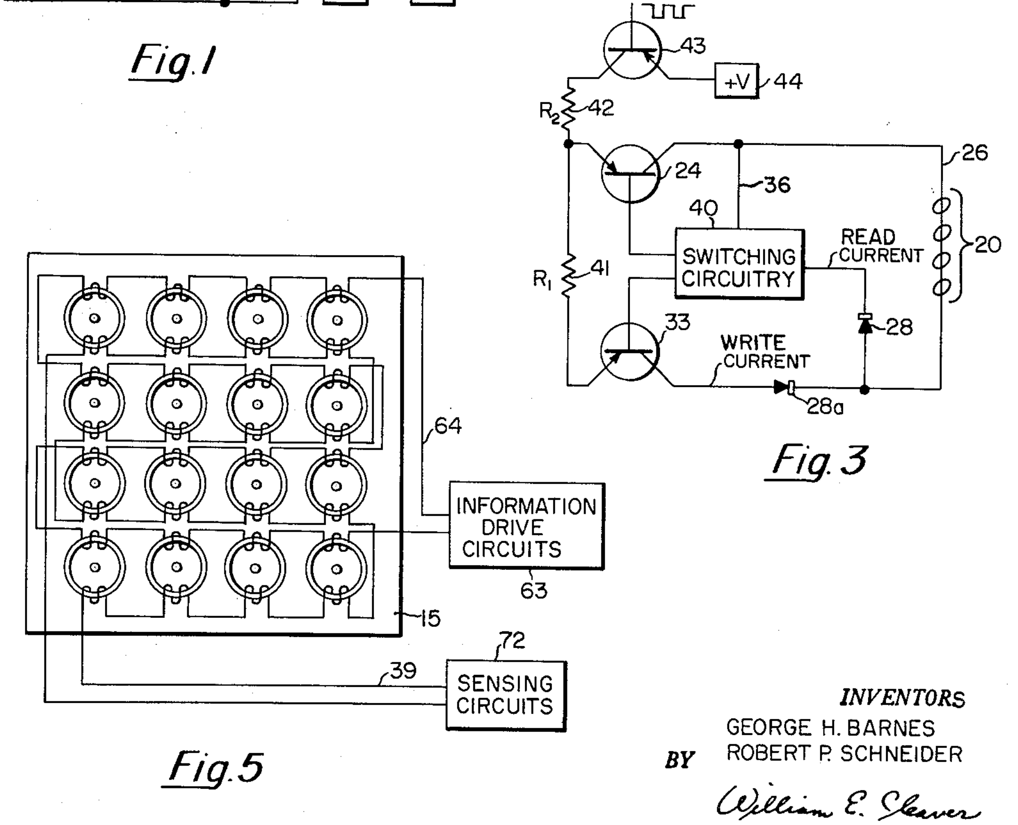
FIG. 3 is a schematic diagram of a modified read-write drive circuit for a plurality of cores representing a binary coded word.
FIG. 5 shows in further detail one of the digit planes illustrated in FIG. 4, wherein the additional control windings are shown.

In FIG. 3 the transistors, cores and diodes are labeled with the same reference numbers as, and the connections are similar to, those shown in FIG. 1. The block 40 entitled "Switching Circuitry" includes the transistors 25 and 34, the read-write switching control 21, the read and write reference voltage sources 29 and 37 and the other necessary voltage sources shown in FIG. 1. In addition, the circuit of FIG. 3 includes a resistor 41 and a resistor 42, as well as an amplifier transistor 43. The two resistances 41 and 42 represent a means for providing a write drive current having the two-thirds switching value above referred to and a read current having unit switching value. If the circuit paths are followed as described in connection with FIG. 1, it becomes apparent that the read current will be a function of the voltage of the source 44 divided by $r_2$, while the write current will be a function of the voltage of the source 44 divided by $r_2$ plus $r_1$.

Referring now to FIG. 4, there is shown a four plane magnetic core memory for storing sixteen words of four bits each. Coupled to the memory circuits are address switch circuits 45. The address switching circuits 45 are of the diode switching matrix variety and provide signals to the proper read-write control devices as desired by the data processing system. There are shown applied to the base of the transistor amplifier 46, in FIG. 4, negative read-write input pulses 47R and 47W respectively. Assume that the four cores 53 through 56 (having an address of row 1, column 4, in each plane) are in the respective states of magnetic remanence indicated by the small numerals in parenthesis above each of the cores, namely 1–0–0–1. At the time that the negative read pulse 47R is applied to the base of the transistor 46, the address switching circuits 45 apply, by means of line 48, a negative potential to the base element of the transistor 12*d*, associated with column 4 to forward bias the four diodes 13*d*. The address switching circuit 45 also applies a negative potential by way of leads 49 and 57 to the left hand diode of each of the diode groups 14*a*, 14*b*, 14*c* and 14*d* to back-bias these diodes. With the right hand diode of group 14*d* back-biased, the read current path can be traced from the positive current source 50, through the transistor 46, through the resistor 51, through the transistor 12*d*, through the top diode of the 13*d* group to the single wire 52, through the cores 53, 54, 55 and 56, along the wire 57 to the junction point 58, and along the lead 49 to the address switching circuits 45. The read current, passing through the path just described, will drive the cores 53 and 56 from the "one" to the "zero" state of magnetization. Since the cores 54 and 55 were already in the "zero" state of magnetization there will be substantially no magnetic flux change and consequently no voltage induced in the sensing winding associated with the second and third planes. The cores 53 and 56, having been switched from the "one" to the "zero" state of magnetization, will experience a flux change which will induce a read-out signal on associated sensing wires, such as 39 of FIG. 5. In order to simplify the schematic, such sensing leads are not shown in FIG. 4, but in practice would be there. Subsequently, the negative write pulse 47W is applied to the base of transistor 46 and the transistor again begins to conduct. Simultaneously with the occurrence of the write pulse 47W, there is applied to the base element of the transistor 11*a* by way of the wire 59, a negative potential which causes the transistor 11*a* to conduct. At the same time, there is provided a negative potential to the lead in the cable 60 connected to the cathode of the left hand diode of group 14*d*. The write current path may be traced from the positive current source 50, through the transistor 46, through the resistor 51, through the resistor 61, through the transistor 11*a*, along the common wire 57 to the single wire 52, through the cores 56, 55, 54 and 53 by way of the wire 52, downward to the cable 62, and through the left hand diode of the group 14*d* to the negative potential in the address switching circuit by way of the cable 60. By proper selection of the value of the additional resistor 61 in the write current circuit, the write drive current is held at two-thirds of the current value necessary to switch the cores. This technique was described above.

Referring now to FIG. 5 as well as FIG. 4, simultaneously with the write pulse 47W being applied to the base of amplifier 46, an information drive current is passed from the information drive circuit 63 of FIG. 5, along the common information drive line 64. Depending upon whether a binary "one" or a "zero" is to be written in the respective cores 53 through 56, the information drive currents for the individual planes will be of a polarity to either aid or oppose the magnetizing force of the write drive current; and the information drive currents have a value which is equal to one-third of the current value necessary to completely switch the core. As described earlier, this arrangement provides a three-to-one signal-to-noise ratio for the system. By proper selection of the address wires, any of the sixteen four-bit words stored on the four planes 15 through 18 may be read out along the respective sensing wires typically shown in FIG. 5 and understood to be present in each of the planes 15 through 18.

Because a signal-to-noise ratio of three-to-one can be effected, the core tolerances need not be as stringent as in the coincidence current technique arrangements wherein the signal-to-noise ratio is normally 2 to 1. It follows that where large variations of ambient temperatures are a consideration which ultimately affect the characteristics of the cores, the present inventive drive circuit is desirable.

A further examination of FIG. 4 will reveal the most important utility of the two diode-designated paths as shown in the basic building block circuit of FIG. 1. The inclusion of the diodes to determine the read and the write current paths renders only the selected paths operative and eliminates any back circuits. For instance, if the diodes designated as the group 13*a* were to be eliminated in favor of a single diode at that point, and likewise there was a single diode provided in place of the group of diodes 13*b*, and further, these respective replacement diodes were connected in common to the four vertical wires in the columns respectively 65 and 66, there would be provided back circuits. Such a back circuit becomes evident if the following illustration is considered. Assume with the single diode replacements in the circuits that the system is commanding a read-out of the cores lying along the wire 67. The desired path of current flow would be along the lead 67 to the back wire 57. However, there would also be a path along the single lead 68 to the back wire 69 in a reverse direction along the wire 70 which is common connected in the hypothesis to the wire 71, along the wire 71 back to the end wire 57. This would mean that although wire 67 was the designated wire to receive the current flow, there would also be current flow through the wires 68, 70 and 71 which would cause all of the cores lying or threaded by these wires to be subjected to a switching current. This back path, of course, is not possible in the present inventive circuit because if the circuit just described is traced out with the diodes 13*a* and 13*b* operative as in FIG. 4, it becomes clear that the diodes 13*a* and 13*b* block such undesirable current flow.

FIG. 5 shows a plane such as plane 15 of FIG. 4. FIG. 5 includes an information drive circuit 63 and an information drive wire 64. The drive wire 64 is similar to the drive wire 38 of FIG. 2. The drive wire 64 is series coupled to, or wound on, each of the cores of the plane 15. Also in FIG. 5 there is shown a sensing circuit 72. The sensing winding 39 is identical with the sensing lead 30 of FIG. 2. The arrangement of the information drive winding 64 and the sensing winding 39 with each of the cores on a particular plane is shown in FIG. 5 to further clarify the overall operation of the magnetic core memory system. As suggested earlier in the disclosure, although the sensing winding and the information drive winding is not shown on the FIGS. 1, 3 and 4, it is to be understood that each of the planes and cores shown in the various figures include the information and sense windings arranged substantially identically with the arrangement of FIG. 5.

This invention as described and claimed recites a variation and improvement over those inventions disclosed and claimed in co-pending application Serial No. 308,183, filed September 6, 1952, for "Static Memory System," in the name of Lyle G. Thompson, and in co-pending application Serial No. 782,752, filed December 24, 1958, for "Current Steering Circuit," in the names of A. J. Meyerhoff and H. C. Goodman, assigned to a common assignee, and whereby common conductivity type transistors may be utilized in the read-write operations.

While we have described the above principles of our invention in connection with specific apparatus, it is to be fully understood that this description is made only by way of example and not as a limitation to the scope of our invention as set forth in the objects thereof and in the accompanying claims.

We claim:

1. An electrical current steering circuit comprising a load means, first and second unidirectional current conducting devices, common circuitry means coupling said first and second unidirectional devices to said load, said first unidirectional device in conjunction with said load forming a first direction current conducting path, said second unidirectional device in conjunction with said load forming a second direction current conducting path, first and second current generating means including equal conductivity type transistors respectively series coupled to said first and second paths to supply current thereto, first and second reference voltage sources, and switching means to selectively couple said first and second voltage sources to said first and second current paths to alternatively provide current conduction thorugh said load along said first and second direction paths.

2. An electrical current steering circuit comprising load mean having first and second terminals, first and second unidirectional current conducting devices being common connected to said first terminal, said first unidirectional current conducting device co-acting with said load to form a first direction current conducting path, said second unidirectional current conducting device co-acting with said load to form a second direction current conducting path, first and second electrical current generators including equal conductivity type transistors respectively coupled to said first and second current conducting paths, first and second reference voltage sources, and switching means to selectively coupled said voltage sources to said generators and said unidirectional current devices to cause current flow in a first direction from said first generator through said load means and through said second unidirectional current device and alternatively to cause current flow in a second direction from said second generator through said load and through said first unidirectional current device.

3. An electrical current steering circuit comprising: a load means, first and second unidirectional current conducting devices, circuitry means coupling the normally forward biased point of said first unidirectional device to said load and the normally back biased point of said second unidirectional device to said load, first and second current generating means including equal conductivity type transistors respectively series coupled to said first and second unidirectional devices to supply current to said load therethrough, first and second reference voltage sources, and switching means to selectively couple said first and second voltage sources to said first unidirectional device and said load and to said second unidirectional device and said load to alternatively provide current conducting through said load along a first and second direction.

4. In a magnetic core memory system, a read-write drive circuit comprising a single wire threading a plurality of magnetizable cores to be driven, first and second unidirectional current conducting devices coupled to said single wire, said first unidirectional device in conjunction with said single wire forming a write direction current conducting path, said second unidirectional device in conjunction with said single wire forming a read direction current conducting path, first and second current generating means including equal conductivity type transistors respectively series coupled to said write and read current conducting paths to supply driving and switching means to selectively couple said current thereto, first and second reference voltage sources, first and second reference voltage sources to said write and read current conducting paths to alternatively provide driving current through said cores along said write and read direction paths.

5. In a magnetic core memory system a read-write drive circuit according to claim 4 wherein said first and second unidirectional current conducting devices include respectively a first and second diode.

6. In a magnetic core memory system a read-write drive circuit comprising a single wire threading a plurality of magnetizable cores to be driven, first and second current generators including equal conductivity type transistors coupled to first and second ends of said wire, first and second reference voltage sources, first and second unidirectional current conducting devices respectively coupled to said first and second reference voltage sources, and switching means to selectively couple said voltage sources to said generators through said unidirectional current devices to cause write current flow from said first generator through said plurality of cores and through said second unidirectional current device and alternatively to cause read current flow from said second generator through said cores and through said first unidirectional current device.

7. In a magnetic core memory system a read-write drive circuit comprising a single wire threading a plurality of magnetizable cores to be driven, first and second unidirectional current conducting devices, circuitry means coupling the normally forward biased point of said first unidirectional device and the normally back biased point of said second unidirectional device to a common point on the first end of said single wire, said first unidirectional current conducting device co-acting with said single wire to form a first direction current conducting path therethrough, said second unidirectional current conducting device co-acting with said single wire to form a second direction current conducting path therethrough, first and second current generating means including equal conductivity type transistors respectively series coupled to said first and second directional current conducting paths to supply current to said single wire, first and second reference voltage sources, and switching means to selectively couple said first source to said first unidirectional device and said second voltage source to the second end of said single wire to alternatively provide current conduction through said single wire to selectively produce a flux linking said magnetizable cores in a first and a second direction.

8. In a magnetic core memory system, a read-write drive circuit comprising a single wire threading a plurality of magnetizable cores to be driven, first and second unidirectional current conducting devices coupled to said single wire, said first unidirectional device in conjunction with said single wire forming a write direction current conducting path, said second unidirectional device in conjunction with said single wire forming a read direction current conducting path, first and second current generating means, first and second resistor means respectively coupled to said first and second current generating means to produce in conjunction therewith respectively first and second different valued currents therefrom, said first and second current generating means respectively series coupled to said write and read current conducting paths to supply driving current thereto, first and second reference voltage sources, and switching means to selectively couple said first and second voltage sources to said write and read current conducting paths to alternatively provide driving current of first and second values through said cores along said respective write and read direction paths.

9. In a magnetic core memory system, a read-write drive circuit according to claim 8 wherein said resistor elements are series connected to each other and wherein there is further included a current amplifying means series coupled to said series connected resistors.

10. In a multi-word magnetic core memory system, including a plurality of planes with each plane having a plurality of magnetizable cores thereon and stacked vertically such that the cores lying along a vertical line represent bits of a word, a read-write drive current system comprising a plurality of single wires, each of said single wires threading a group of cores which cores each lie in a different one of said planes and together represent a word, a plurality of first and second unidirectional current conducting devices, one each of said first and second unidirectional devices associated with each of said single wires and coupled thereto, each of said first unidirectional devices in conjunction with its associated single wire forming a write direction current conducting path, each of said second unidirectional devices in conjunction with its associated single wire forming a read direction current conducting path, a plurality of first and second current generating means including equal conductivity type transistors, one each of said first and second current generating means associated with each single wire, each associated first and second current generating means respectively series coupled to the read and write current conducting paths of its associated single wire, first and second reference voltage sources, and switching means to selectively couple said first and second reference voltage sources to any one of said read and write current conducting paths to selectively and alternatively produce driving current along said read and write direction paths through a group of said cores representing a word.

References Cited in the file of this patent

UNITED STATES PATENTS 2,784,391 Rajchman et al. ---------- Mar. 5, 1957
2,785,236 Bright et al. ------------ Mar. 12, 1957

UNITED STATES PATENT OFFICE
CERTIFICATE OF CORRECTION

Patent No. 2,993,198 July 18, 1961

George H. Barnes et al.

It is hereby certified that error appears in the above numbered patent requiring correction and that the said Letters Patent should read as corrected below.

Column 3, line 6, for "occupy" read -- occur --; column 9, line 4, for "mean" read -- means --; line 15, for "coupled" read -- couple --; same column 9, lines 50, 51 and 52, strike out "and switching means to selectively couple said current thereto, first and second reference voltage sources, first and second reference voltage sources" and insert instead -- current thereto, first and second reference voltage sources and switching means to selectively couple said first and second reference voltage sources --.

Signed and sealed this 12th day of December 1961.

(SEAL)
Attest:

ERNEST W. SWIDER
Attesting Officer

DAVID L. LADD
Commissioner of Patents